United States Patent Office 3,736,251
Patented May 29, 1973

3,736,251
HYDROTREATING HYDROCARBONS WITH A
Pt-Ge-Re-CATALYST
John C. Hayes, Palatine, Ill., assignor to Universal Oil
Products Company, Des Plaines, Ill.
No Drawing. Application Sept. 5, 1969, Ser. No. 855,725,
which is a continuation-in-part of application Ser. No.
839,086, July 3, 1969. Divided and this application
May 10, 1971, Ser. No. 142,080
Int. Cl. C10g 23/04
U.S. Cl. 208—143                                    6 Claims

ABSTRACT OF THE DISCLOSURE

A process for hydrotreating hydrocarbons and mixtures of hydrocarbons utilizing a catalytic composite of a porous carrier material, a rhenium component, a germanium component and a Group VIII noble metal component. Applicable to processing charge stocks containing sulfurous compounds and aromatic hydrocarbons, the hydrotreating conditions can be controlled to effect a particular end result including the ring-opening of cyclic hydrocarbons for producing jet fuel components, desulfurization, denitrification, selective olefin saturation, etc.

RELATED APPLICATIONS

The present application is a division of my copending application, Ser. No. 855,725, filed Sept. 5, 1969, now Pat. No. 3,617,510, Nov. 2, 1971, which, in turn, is a continuation-in-part of my copending application, Ser. No. 839,086, filed July 3, 1969, now abandoned, all the teachings of which copending applications are incorporated herein by specific reference thereto. The present application is filed to comply with a requirement for restriction in my copending application, Ser. No. 855,725.

APPLICABILITY OF INVENTION

The present invention encompasses the use of a catalytic composite of a porous carrier material, a rhenium component, a germanium component and a Group VIII noble metal component in the hydrotreating of hydrocarbons and various mixtures of hydrocarbons. As utilized herein, the term "hydrotreating" is intended to be synonymous with the term "hydroprocessing," and involves the conversion of hydrocarbons at such operating conditions as will effect a chemical consumption of hydrogen. Processes intended to be encompassed by the term "hydrotreating" include ring-opening of cyclic hydrocarbons, hydrorefining (for nitrogen removal and olefin saturation), desulfurization (often included in hydrorefining), etc. As will be recognized, one common attribute of these processes, and the reactions being effected therein, is that they are hydrogen-consuming, and are, therefore, exothermic in nature. In employing the term, "hydrotreating," it is intended to allude to a hydrocarbon conversion process wherein a chemical consumption of hydrogen is effected. It is, however, intended to exclude those conversion processes in which the hydrogen consumption stems primarily from the saturation of light olefins, resulting from undesirable cracking of charge stock and/or product components, which, in turn, produces light gaseous waste material, principally methane, ethane and propane. In essence, therefore, the present invention is directed toward the removal of various contaminating influences from a variety of hydrocarbonaceous charge stocks. The individual characteristics of the foregoing hydrotreating processes, including preferred operating conditions and processing techniques, will be hereinafter described in greater detail.

The present invention involves the use of a catalytic composite having exceptional activity and resistance to deactivation in a hydrogen-consuming process. The use of a particular dual-function catalytic composite enables substantial improvements in those hydrotreating processes that have traditionally used a dual-function catalyst. The catalytic composite comprises a porous carrier material, a rhenium component, a germanium component and a Group VIII noble metal component, with the improvement being noted in activity, desired product selectivity and operational stability characteristics. Dual-function catalytic composites are used to promote a wide variety of hydrocarbon conversion reactions including hydrocracking, isomerization, dehydrogenation, hydrogenation, desulfurization, ring-opening, catalytic reforming, cyclization, aromatization, alkylation, polymerization, cracking, etc., some of which reactions are hydrogen-producing, while others are hydrogen-consuming. It is to the latter group of reactions, hydrogen-consuming, that the present invention is primarily applicable. In many instances, the commercial application of these catalysts resides in processes where more than one of the reactions proceed simultaneously. An example of this type of process is the conversion of aromatic hydrocarbons into jet fuel components, principally straight, or slightly branched-chain paraffins, wherein both ring-opening and hydrogenation are effected.

Regardless of the reaction involved, or the particular process, it is important for the catalyst to exhibit the capability (1) to perform its specified functions initially, and (2) to perform them satisfactorily for a prolonged period of time. The analytical terms employed in petroleum refining art to measure how efficient a particular catalyst performs its intended functions, in a given hydrocarbon conversion process to produce the particular desired results, are activity, selectivity and stability. With respect to a hydrogen-consuming process for the production of jet fuel components from cyclic hydrocarbons, "activity" generally connotes the quantity of cyclics which are converted. "Selectivity" refers to the quantity of paraffins produced from the converted charge stock. "Stability" connotes the rate of change of activity and selectivity.

It is well known to those skilled in the art, being generally conceded, that the principal cause of deactivation or instability of a dual-function catalyst is associated with the fact that coke forms on the surface of the catalyst during the course of the reaction. More specifically, in the various hydrocarbon conversion processes, and especially those which are categorized as hydrogen-consuming, the necessary operating conditions are such that the formation of high molecular weight, black, solid or semisolid, hydrogen-poor carbonaceous material is effected. This coats the surface of the catalyst and reduces its activity by shielding the active sites from the reactants. It is axiomatic that the performance characteristics of dual-function catalysts are very sensitive to the presence of carbonaceous deposits on the surface thereof. Accordingly, a major problem facing workers in the area of catalysis, is the development of more active and selective catalytic composites which are not as sensitive to the presence of these carbonaceous materials, and/or which have the capability to suppress the rate of formation thereof at the operating conditions employed in a particular process utilizing a particular type of feed stock.

One who is cognizant of petroleum refining processes and techniques, will recognize that a dual-function catalyst having superior characteristics of activity, selectivity and stability contains a Group VIII noble metal component. This type of catalyst has been widely used in processes such as hydroisomerization, dehydrogenation, dehydrocyclization, hydrocracking, catalytic reforming, and the like. This catalyst has achieved a dominant position in the art despite the fact that its principal ingredient, a noble metal, is extremely expensive, in relatively short supply and has demonstrated a history of ever-increasing cost. The economic picture, with respect to Group VIII noble metal-containing catalysts, has served as a powerful incentive for continuous, far-reaching investigations directed at finding acceptable catalytic composites having improved processing characteristics, particularly respecting activity, selectivity and stability. One such catalytic composite, prominently described in the literature, results from the addition of a rhenium component to the noble metal component. Significantly, extensive investigations have indicated that a catalyst of rhenium alone possesses a degree of activity and stability which is considerably less than the conventional noble metal catalyst. As a result of my investigations, I have found a dual-function catalyst which affords added improvement over the rhenium-noble metal catalyst.

In particular, I have found that the use of catalytic composites of a germanium component, a rhenium component and a Group VIII noble metal component, with a porous carrier material improves the overall operation of hydrotreating processes. As indicated, the present invention essentially involves the use of a catalyst in which a germanium component has been added to a rhenium-noble metal, dual-function conversion catalyst whereby the performance characteristics of the process are sharply and materially improved.

OBJECTS AND EMBODIMENTS

An object of the present invention is to afford a process for hydrotreating a hydrocarbon, or mixtures of hydrocarbons. A corollary objective is to improve the stability of hydrocarbon hydrotreating utilizing a highly active, germanium component-containing catalytic composite.

A specific object of my invention resides in the improvement of hydrogen-consuming processes including hydrorefining, ring-opening for jet fuel production, desulfurization, denitrification, etc.

Therefore, in one embodiment, the present invention relates to a process for hydrotreating a hydrocarbonaceous charge stock containing sulfurous compounds and aromatic hydrocarbons which comprises reacting said charge stock and hydrogen in a reaction zone and in contact with a catalytic composite containing a rhenium component, a germanium component and a Group VIII noble metal component combined with a porous carrier material.

One specific embodiment is directed toward a process for hydrotreating a hydrocarbon which comprises reacting said hydrocarbon with hydrogen at hydrotreating conditions selected to effect chemical consumption of hydrogen, and in contact with a catalytic composite of a rhenium component, a germanium component, a platinum or palladium component and a porous carrier material, said process being further characterized in that said catalytic composite is reduced and sulfided prior to contacting said hydrocarbon.

In another specific embodiment, said charge stock is a coke-forming hydrocarbon distillate also containing di-olefinic and mono-olefinic hydrocarbons, hydrogen is reacted therewith at conditions including a maximum catalyst bed temperature in the range of from 200° F. to about 500° F., said catalytic composite contains an alkalinous metal component and the reaction product effluent is separated to recover an aromatic/mono-olefinic hydrocarbon concentrate substantially free from conjugated di-olefinic hydrocarbons.

Other objects and embodiments of my invention relate to additional details regarding preferred catalytic ingredients, the concentration of components in the catalytic composite, methods of catalyst preparation, individual operating conditions for use in the various hydrocarbon hydrotreating processes, preferred processing techniques and similar particulars which are hereinafter given in the following more detailed summary of my invention.

SUMMARY OF INVENTION

As hereinabove set forth, the present invention involves the hydrotreating of hydrocarbons and mixtures of hydrocarbons, utilizing a particular catalytic composite. This catalyst comprises a porous carrier material having combined therewith a rhenium component, a germanium component and a Group VIII noble metal component; in many applications, the catalytic composite will also contain a halogen component, and, in some select applications, an alkali metal or alkaline-earth metal component. Considering first the porous carrier material, it is preferred that it be an absorptive, high-surface area support having a surface area of about 25 to about 500 square meters per gram. It is intended to include those carrier materials which have traditionally been utilized in dual-function hydrocarbon conversion catalysts. In particular, suitable carrier materials are selected from the group of amorphous refractory inorganic oxides including alumina, titania, zirconia, chromia, magnesia, thoria, boria, silica-alumina, silica-magnesia, chromia—alumina, alumina-boria, alumina-silica-boron phosphate, silica-zirconia, etc. When of the amorphous refractory inorganic oxide type, a preferred carrier material constitutes a composite of alumina and silica, with silica being present in an amount of about 10.0% to about 90.0% by weight, or alumina in and of itself.

In many hydroprocessing applications of the present invention, the carrier material will consist of a crystalline aluminosilicate. This may be naturally-occurring, or synthetically-prepared, and includes mordenite, faujasite, Type A or Type U molecular sieves, etc., with mordenite and faujasite being preferred. When utilized as the carrier material, the zeolitic material may be in the hydrogen form, or in a form which has been treated with multi-valent cations.

As hereinabove set forth, the porous carrier material, for use in the process of the present invention, is a refractory inorganic oxide, and may be either alumina in and of itself, or alumina in combination with one or more other refractory inorganic oxides, and particularly in combination with silica. When utilized as the sole component of the carrier material, the alumina may be of the gamma-, eta-, or theta-alumina type, with gamma- or eta-alumina giving the better results. In addition, preferred carrier materials have an apparent bulk density of about 0.30 to about 0.70 gram per cc. and surface area characteristics indicating an average pore diameter of about 20 to about 300 angstroms, a pore volume of about 0.10 to about 1.0 milliliter per gram and a surface area of about 100 to about 500 square meters per gram. It is understood that specific methods of preparing the carrier material are not essential to the present invention. For example, an alumina carrier may be prepared by adding a suitable alkaline reagent, such as ammonium hydroxide, to a salt of aluminum, such as aluminum chloride, aluminum nitrate, etc., in an amount to form an aluminum hydroxide gel which, upon drying and calcination, is converted to alumina.

When a crystalline aluminosilicate, or zeolitic material, is intended for use as the carrier, it may be prepared in a number of ways. One common way is to mix solutions of sodium silicate, or colloidal silica, and sodium aluminate and allow these solutions to react to form a solid crystalline aluminosilicate. Another method is to contact a solid inorganic oxide from the group of silica, alumina, and mixtures thereof, with an aqueous treating solution containing alkali metal cations (preferably sodium) and anions selected from the group of hydroxyl, silicate and aluminate, and allow the solid-liquid mixture to react until the desired crystalline aluminosilicate has been formed. One particular method is especially preferred when the carrier material is intended to be a crystalline aluminosilicate, and a specific illustration thereof is hereafter set forth. This stems from the fact that the method affords a carrier material of substantially pure crystalline aluminosilicate particles. In employing the term "substantially pure," the intended connotation is an aggregate particle at least 90.0% by weight of which is zeolitic. Thus, the carrier material is distinguished from an amorphous carrier material, or prior art pills and/or extrudates in which the zeolitic material might be dispersed within an amorphous matrix with the result that only about 40.0% to about 70.0% by weight of the final particle is zeolitic.

The preferred method of preparing the carrier material produces crystalline aluminosilicates of the faujasite modification, and utilizes aqueous solutions of colloidal silica and sodium aluminate. Colloidal silica is a suspension in which the suspended particles are present in a very finely-divided form—i.e. having a particle size from about one to about 500 millimicrons in diameter.

After the solid crystalline aluminosilicate has been formed, the mother liquor is separated from the solids by methods including decantation, filtration, etc. The solids are water-washed and filtered to remove undesirable ions, and to reduce the quantity of amorphous material, and are then reslurried in water to a solids concentration of about 5.0 to about 50.0% by weight. The cake and water are then violently agitated and homogenized until the agglomerates are broken and the solids are uniformly dispersed in what appears to be a colloidal suspension. The suspension is then spray dried by conventional means, such as pressurizing the suspension through an orifice into a hot dry chamber. The solid particles are withdrawn from the drying chamber and are suitable for forming into finished particles of a desired size and shape. The preferred form of the finished particle is a cylindrical pill, and these may be prepared by introducing the spray dried particles directly into a pilling machine without the addition of an extraneous lubricant or binder. The pilled faujasite carrier material, of which at least about 90.0% by weight is zeolitic, is activated catalytically by converting the sodium form either to the divalent form, the hydrogen form or mixtures thereof.

An essential constituent of the catalytic composite used in the hydrocarbon hydroprocessing scheme of the present invention is a germanium component, and it is a preferred, but not restrictive feature, that the germanium component be present in an oxidation state above that of the elemental metal. That is to say, the germanium component exists within the catalytic composite in either the +2 or +4 oxidation state, the latter being the most likely state. Accordingly, the germanium component will be present in the composite as a chemical compound, such as the oxide, sulfide, halide, etc., or as a chemical combination with the carrier material. On the basis of the evidence currently available, it is believed that the germanium component exists as germanous or germanic oxide. This germanium component may be incorporated in the catalytic composite in any suitable manner known to the art such as by co-precipitation or cogellation with the porous carrier material, ion-exchange with the gelled carrier material or impregnation with the carrier material either after or before it is dried and calcined. It is to be noted that it is intended to include within the scope of the present invention all conventional methods for incorporating a metallic component in a catalytic composite and the particular method of incorporation used is not deemed to be an essential feature of the present invention. One method of incorporating the germanium component into the catalytic composite involves co-precipitating the germanium component during the preparation of the carrier material, such as alumina or alumina-silica. This method typically involves the addition of a suitable soluble germanium compound such as germanium tetrachloride to the inorganic oxide hydrosol and then combining the hydrosol with a suitable gelling agent and dropping the resultant mixture into an oil bath maintained at elevated temperatures. The droplets remain in the oil bath until they set and form hydrogel spheres. The spheres are withdrawn from the oil bath and subjected to specific aging treatments in oil and in an ammoniacal solution. The aged spheres are washed and dried at a temperature of about 200° F. to about 400° F., and thereafter calcined at an elevated temperature of about 850° F. to about 1300° F. Further details of spherical particles production may be found in U.S. Pat. 2,620,314, issued to James Hoekstra. After drying and calcining the resulting gelled carrier material, an intimate combination of alumina and germanium oxide is obtained.

A preferred method of incorporating the germanium component into the catalytic composite involves the utilization of a soluble, decomposable compound of germanium to impregnate the porous carrier material. In general, the solvent used in this impregnation step is selected on the basis of the capability to dissolve the desired germanium compound, and is preferably an aqueous or alcoholic solution. Thus, the germanium component may be added to the carrier material by commingling the latter with a solution of a suitable germanium salt or suitable compound of germanium, such as germanium tetrachloride, germanium difluoride, germanium tetrafluoride, germanium di-iodide, germanium monosulfide, and the like compounds. A particularly preferred impregnation solution comprises nascent germanium metal dissolved in chlorine water to yield germanium monoxide. In general, the germanium component can be impregnated either prior to, simultaneously with, or after the Group VIII noble metal component. However, I have found that excellent results are obtained when the germanium component is impregnated simultaneously with the Group VIII noble metal component and the rhenium component. In fact, I have determined that a preferred impregnation solution contains chloroplatinic acid, perrhenic acid, hydrogen chloride, and germanous oxide dissolved in chlorine water, especially when the catalyst is intended to contain combined chloride. Following the impregnation step, the resulting composite is dried and calcined.

Regardless of which germanium compound is used in the preferred impregnation step, it is important that the germanium component be uniformly distributed throughout the carrier material. It is preferred to use a volume ratio of impregnation solution to carrier material of at least 1.5:1 and preferably about 2:1 to about 10:1, or more, and to maintain the pH in the range of 1.0 to 7.0. Similarly, it is preferred to use a relatively long contact time during the impregnation step ranging from about ¼-hour up to about ½-hour or more before drying to remove excess solvent in order to insure a high dispersion of the germanium component on the carrier material. The carrier material is, likewise, preferably constantly agitated during this preferred impregnation step.

As previously indicated, the catalyst for use in the process of the present invention also contains a Group VIII noble metal component. Although the process of the present invention is specifically directed to the use of a catalytic composite containing platinum, it is intended to include other Group VIII noble metals such as palladium, rhodium, ruthenium, osmium and iridinum. The Group VIII noble metal component, for example platinum, may exist within the final catalytic composite as a compound such as an oxide, sulfide, halide, etc., or in an elemental state. The Group VIII noble metal component generally comprises about 0.01% to about 2.0% by weight of the final composite, calculated on an elemental basis. In addition to platinum, another particularly preferred Group VIII noble metal component is palladium, or a compound of palladium.

The Group VIII noble metal component may be incorporated within the catalytic composite in any suitable manner including co-preciptation or cogelation with the carrier material, ion-exchange, or impregnation. A preferred method of preparation involves the utilization of a water-soluble compound of a Group VIII noble metal component in an impregnation technique. Thus, a platinum component may be added to the carrier material by commingling the latter with an aqueous solution of chloroplatinic acid. Other water-soluble compounds of platinum may be employed, and include ammonium chloroplatinate, platinum chloride, dinitro diamino platinum, etc. The use of a platinum chloride compound, such as chloroplatinic acid, is preferred since it facilitates the incorporation of both the platinum component and at least a minor quantity of the halogen component in a single-step. In addition, it is generally preferred to impregnate the carrier material after it has been calcined in order to minimize the risk of washing away the valuable Group VIII noble metal compounds; however, in some instances it may prove advantageous to impregnate the carrier material when it exists in a gelled state.

Regardless of how the components of the catalyst are combined with the carrier material, the final composite will generally be dried at a temperature of about 200° F. to about 600° F., for a period of from 2 to about 24 hours or more, and finally calcined at a temperature of about 700° F. to about 1100° F. in an atmosphere of air, for a period of about 0.5 to about 10 hours in order to convert the metallic components substantially to the oxide form. When the carrier material constitutes a crystalline aluminosilicate, it is preferred that the calcination temperature not exceed about 1000° F.

Another essential component of the catalytic composite is a rhenium component. This component may also be present as an elemental metal, as a chemical compound such as the oxide, sulfide, halide, etc., or in a physical or chemical combination with the porous carrier material and/or other components of the catalytic composite. The rhenium component is usually utilized in an amount sufficient to result in a final catalytic composite containing about 0.01% to about 2.0% by weight of rhenium, calculated on an elemental basis. The rhenium may be incorporated within the catalytic composite in any suitable manner, and during any selected stage in the preparation of the catalyst. It is generally advisable to incorporate the rhenium component by way of an impregnation step after the porous carrier material has been formed in order that the expensive metal will not be lost due to washing and purification techniques applied to the carrier material during the course of its preparation. Although any suitable method for incorporating a catalytic component into a porous carrier material can be utilized to incorporate the rhenium component, the preferred procedure involves impregnation of the porous carrier material. The impregnating solution can, in general, be a solution of a suitable soluble, decomposable rhenium salt such as ammonium perrhenate, sodium perrhenate, potassium perrhenate, and the like salts. In addition, solutions of rhenium halides such as rhenium chloride, rhenium fluoride, etc., may be used, with the preferred impregnating solution being an aqueous solution of perrhenic acid. The porous carrier material can be impregnated with the rhenium component either prior to, simultaneously with, or after the other components herein mentioned have been combined therewith.

Although not essential to successful hydroprocessing in all cases, in fact detrimental in some, it is preferred to incorporate a halogen component into the catalytic composite. Accordingly, one catalyst composite, suitable for utilization in at least one embodiment of the present invention, comprises a combination of a germanium component, a rhenium component, a halogen component and a noble metal component. Although the precise form of the chemistry of the association of the halogen component with the carrier material and metallic components is not accurately known, it is customary in the art to refer to the halogen component as being combined with the carrier material, or with the other ingredients of the catalyst. The combined halogen may be either fluorine, chlorine, iodine, bromine, or mixtures thereof. Of these, fluorine and particularly chlorine are preferred for the hydrotreating processes encompassed by the present invention. The halogen may be added to the carrier material in any suitable manner, and either during preparation of the carrier, or before, or after the addition of the other components. For example, the halogen may be added at any stage in the preparation of the carrier material, or to the calcined carried material, and in the form of an aqueous solution of an acid such as hydrogen fluoride, hydrogen chloride, hydrogen bromide, hydrogen iodide, etc. The halogen component or a portion thereof may be composited with the carrier material during the impregnation of the latter with either the rhenium component, the germanium component, or both. The hydrosol, which is typically utilized to form the amorphous carrier material, may contain halogen and thus contribute at least a portion of the halogen component to the final composite. The quantity of halogen is such that the final catalytic composite contains about 0.1% to about 3.5% by weight, and preferably from about 0.5 to about 1.5% by weight, calculated on the basis of the elemental halogen.

When used in many of the hydrogen-consuming processes hereinbefore described, the foregoing quantities of metallic components will be combined with a carrier material of alumina and silica, wherein the silica concentration is 10.0% to about 90.0% by weight. In processes where the natural acid function of the catalytic composite must necessarily be attenuated, the metallic components will be combined with a carrier material consisting essentially of alumina. In this latter situation, a halogen component is often not combined with the catalytic composite, and the inherent acid function of the dual-function catalytically active metallic component is further attenuated through the addition of from 0.01% to about 1.5% by weight of an alkalinous metal component. One such process, in which the acid function of the catalyst must necessarily be attenuated, is the process wherein an aromatic hydrocarbon/olefinic hydrocarbon charge stock is hydrogenated to produce a product stream substantially free from di-olefinic hydrocarbons and rich in aromatics. In order to avoid ring-opening, and to inhibit polymer formation, an alkalinous metal component is combined with the catalytic composite in an amount of from 0.01% to about 1.5% by weight. This component is selected from the group of lithium, sodium, potassium, rubidium, cesium, barium, strontium, calcium, magnesium, beryllium, mixtures of two or more, etc. In general, more advantageous results are achieved through the use of the alkali metals, particularly lithium and/or potassium.

Regarding the preferred amount of the various metallic components of the catalyst, I have found it to be a good practice to specify the quantities of the rehenium component and the germanium component as a function of the amount of the noble metal component. On this basis, the amount of the rhenium component is ordinarily selected so the atomic ratio of rhenium to the noble metal component is about 0.1:1.0 to about 3.0:1.0. Similarly, the amount of the germanium component is ordinarily selected to produce a composite containing an atomic ratio of germanium to noble metal of about 0.25:1.0 to about 6.0:1.0.

Another significant parameter for the subject catalyst is the "total metals content" which is defined to be the sum of the noble metal component, the rhenium component, and the germanium component, calculated on an elemental germanium, rhenium and noble metal basis. Good results are ordinarily obtained with the subject catalyst when this parameter is fixed at a value of about 0.15% to about 4.0% by weight, with best results ordinarily achieved at a metals loading of about 0.3% to about 2.0% by weight.

Correlating the above discussion of each of the essential and preferred components of the catalytic composite, it is evident that a particularly preferred catalytic composite comprises a combination of a Group VIII noble metal component, a rhenium component, a germanium component, often with a halogen component, and a porous carrier material in amounts sufficient to result in the composite containing about 0.5% to about 1.5% by weight of halogen, about 0.05% to about 1.0% by weight of a noble metal component, about 0.05% to about 1.0% by weight of rhenium and about 0.05% to about 2.0% by weight of germanium. Accordingly, specific examples of especially preferred catalytic composites, containing, for example, platinum, are as follows: (1) a catalytic composite comprising a combination of 0.5% by weight of germanium, 0.5% by weight of rhenium, 0.75% by weight of platinum, and about 0.5% to about 1.5% by weight of halogen; (2) a catalytic composite comprising a combination of .1% by weight of germanium, 0.1% by weight of rhenium, 0.1% by weight of platinum, and about 0.5 to about 1.5% by weight of halogen; (3) a catalytic composite comprising a combination of about 0.375% by weight of germanium, 0.375% by weight of rhenium, 0.375% by weight of platinum, and about 0.5 to about 1.5% by weight of halogen; (4) a catalytic composite comprising a combination of 0.2% by weight of germanium, 0.1% by weight of rhenium, 0.5% by weight of platinum, and about 0.5% to about 1.5% by weight of halogen; (5) a catalytic composite comprising a combination of 0.5% by weight of germanium, 0.25% by weight of platinum, 0.25% by weight of rhenium, and about 0.5 to about 1.5% by weight of halogen; and, (6) a catalytic composite comprising a combination of 1.0% by weight of germanium, 0.5% by weight of rhenium, 0.5% by weight of platinum, and about 0.5 to about 1.5% by weight of halogen. The amounts of the components reported in these examples are of course, calculated on an elemental basis. As hereinbefore set forth, halogen component of the foregoing described specific composites may be eliminated where either necessary, or desired.

Prior to its use, the resultant calcined catalytic composite may be subjected to a substantially water-free reduction technique. This technique is designed to insure a more uniform and finely divided dispersion of the metallic components throughout the carrier material. Preferably, substantially pure and dry hydrogen (i.e. less than about 30.0 volume p.p.m. of water) is employed as the reducing agent. The calcined catalyst is contacted at a temperature of about 800° F. to about 1200° F., and for a period of about 0.5 to about 10 hours, or more, and effective to substantially reduce the metal components. This reduction technique may be performed in situ as part of a start-up sequence provided precautions are observed to pre-dry the unit to a substantially water-free state, and if substantially water-free hydrogen is employed.

Again with respect to effecting hydrogen-consuming reactions, the process is generally improved when the reduced composite is subjected to a presulfiding operation designed to incorporate from about 0.05% to about 0.50% by weight of sulfur, on an elemental basis. This presulfiding treatment takes place in the presence of hydrogen and a suitable sulfur-containing compound including hydrogen sulfide, lower molecular weight mercaptans, organic sulfides, carbon disulfide, etc. This procedure involves treating the reduced catalyst with a sulfiding gas, such as a mixture of hydrogen and hydrogen sulfide, and at conditions sufficient to effect the desired incorporation of sulfur. These conditions include a temperature of from about 50° F. to about 1100° F. It is generally considered a good practice to perform the presulfiding technique under substantially water-free conditions.

According to the present invention, a hydrocarbon charge stock and hydrogen are contacted with a catalyst of the type described above in a hydrocarbon conversion or reaction zone. As hereinafter indicated, the particular catalyst employed is primarily dependent upon the characteristics of the charge stock, as well as the desired end result and the particular hydrotreating process. The contacting may be accomplished by using the catalyst in a fixed-bed system, a moving-bed system, a fluidized-bed system, or in a batch-type operation; however, in view of the risk of attrition loss of the catalyst, it is preferred to use the fixed bed system. Furthermore, it is well known that a fixed-bed catalytic system offers many operational advantages. In this type of system, a hydrogen-rich gaseous phase and the charge stock are preheated by any suitable heating means to the desired reaction temperature, the mixture being passed into the conversion zone containing the fixed-bed of the catalytic composite. It is understood, of course, that the conversion zone may be one or more separate reactors having suitable means therebetween to insure that the desired conversion temperature is maintained at the entrance to the catalyst bed. It should also be noted that the reactants may be contacted with the catalyst bed in either upward, downward or radial flow fashion, with a downward/radial flow being preferred. Additionally, the reactants may be in the liquid phase, a mixed liquid-vapor phase or a vapor phase when they contact the catalyst.

The operating conditions imposed upon the reaction zones are dependent upon the particular hydroprocessing being effected. However, these operating conditions will include a pressure from about 400 to about 5,000 p.s.i.g., an LHSV (liquid hourly space velocity) of about 0.1 to about 10.0, and a hydrogen concentration within the range of about 500 to about 50,000 s.c.f./bbl. In view of the fact that the reactions being effected are exothermic in nature, an increasing temperature gradient is experienced as the hydrogen and feed stock traverse the catalyst bed. For any given hydrogen-consuming process, it is desirable to maintain a maximum catalyst bed temperature below about 900° F., which temperature is virtually identical to that as may be conveniently measured at the outlet of the reaction zone. Hydrogen-consuming processes are conducted at a temperature within the range of about 200° F. to about 900° F., and it is intended herein that the stated temperature of operation alludes to the maximum catalyst bed temperature. In order to assure that the catalyst bed temperature does not exceed the maximum allowed for a given process, conventional quench streams, either normally liquid or gaseous, introduced at one or more intermediate loci of the catalyst bed, may be utilized. In some of the hydrotreating processes encompassed by the present invention, a portion of the normally liquid product effluent will be recycled to combine with the fresh hydrocarbon charge stock. In these situations, the combined liquid feed ratio (defined as volumes of total liquid charge to the reaction zone per volume of fresh feed charge to the reaction zone) will be within the range of about 1.1 to about 6.0.

Specific operating conditions, processing techniques, particular catalytic composites and other individual process details will be given in the following description of several of the hydrotreating schemes to which the present invention is applicable. These will be presented by way of examples given in conjunction with commercially-scaled operating units.

EXAMPLES

In presenting these examples, it is not intended that the present invention be limited to the specific illustrations, nor is it intended that a given hydrotreating process be limited to the particular operating conditions, catalytic composites, processing techniques, charge stocks, etc. It is understood, therefore, that the present invention is merely illustrated by the specifics hereinafter set forth.

EXAMPLE I

One hydrocarbon hydroprocessing scheme, to which the present invention is applicable, involves the hydrorefining of coke-forming hydrocarbon distillates. These distillates are generally sulfurous in nature, and contain monoolefinic, di-olefinic and aromatic hydrocarbons. Through the utilization of a catalytic composite comprising both a germanium component, a rhenium component and a Group VIII noble metal component, increased selectivity and stability of operation is obtained; selectivity is most noticeable with respect to the retention of aromatic hydrocarbons, and in hydrogenating conjugated di-olefinic and mono-olefinic hydrocarbons. Such charge stocks generally result from diverse conversion processes including the catalytic and/or thermal cracking of petroleum, sometimes referred to as pyrolysis, the destructive distillation of wood or coal, shale oil retorting, etc. The impurities in these distillate fractions must necessarily be removed before the distillates are suitable for their intended use, or which when removed, enhance the value of the distillate fraction for further processing. Frequently, it is intended that these charge stocks be substantially desulfurized, saturated to the extent necessary to remove the conjugated di-olefins, while simultaneously retaining the aromatic hydrocarbons. When subjected to hydrotreating for the purpose of removing the contaminating influences, there is encountered difficulty in effecting the desired degree of reaction due to the formation of coke and other carbonaceous material.

As utilized herein, hydrogenating is intended to be synonymous with hydrorefining. The purpose is to provide a highly selective and stable process for hydrogenating coke-forming hydrocarbon distillates accompanied by aromatic retention, and this is accomplished through the use of a fixed-bed catalytic reaction system. There exist two separate, desirable routes for the treatment of coke-forming distillates, for example, a pyrolysis naphtha by-product. One such route is directed toward a product suitable for use in certain gasoline blending. With this as the desired object, the process can be effected in a single stage, or reaction zone, with the catalytic composite hereinafter specifically described as the first stage catalyst. The attainable selectivity in this instance resides primarily in the hydrogenation of highly reactive double bonds. In the case of conjugated di-olefins, the selectivity restricts the hydrogenation to produce mono-olefins, and, with respect to the styrenes, the hydrogenation is inhibited to produce alkylbenzenes with "ring" saturation. The selectivity is accomplished with a minimum of polymer formation either to "gums" or polymers of lower molecular weight would necessitate a re-running of the product effluent prior to blending to gasoline. Other advantages of restricting the hydrogenation of the conjugated di-olefins and styrenes include: lower hydrogen consumption, lower heat of reaction and a higher octane rating gasoline boiling range product. Also, the non-conjugated di-olefins, such as 1,5 normal hexadiene are not usually offensive in suitable inhibited gasolines, in some locales, and will possibly not react to this first stage. Some fresh charge stocks are sufficiently low in mercaptan sulfur content that direct gasoline blending may be considered. Such considerations are generally applicable to foreign markets, particularly European, where oefinic and sulfur-containing gasolines have not become too critical. It must be noted that the sulfurous compounds, and the mono-olefins, whether virgin, or products of di-olefin partial saturation, are unchanged in the single, or first-stage reaction zone. Where, however, the desired end result is aromatic hydrocarbon retention, intended for subsequent extraction, the two-stage route is required. The mono-olefins must be substantially saturated in the second stage to facilitate aromatic extraction by way of currently practiced methods. Thus, the desired ncessary second-stage hydrogenation involves saturation of the mono-olefins, as well as sulfur removal, the latter required for an acceptable aromatic product. Attendant upon this is the necessity to avoid saturation of aromatic nuclei.

With respect to one preferred catalytic composite, its principal function involves the selective hydrogenation of conjugated di-olefinic hydrocarbons to mono-olefinic hydrocarbons. This particular catalytic composite possesses unusual stability notwithstanding the presence of sulfurous compounds in the fresh charge stock. The catalytic composite comprises an alumina-containing refractory inorganic oxide, a germanium component, a rhenium component, an alkalinous metal component, the latter being preferably potassium and/or lithium, and a platinum or palladium component. It is especially preferred, for use in this particular hydrocarbon hydroprocessing scheme, that the catalytic composite be substantially free from any "acid-acting" propensities. The catalytic composite, utilized in the second reaction zone, for the primary purpose of effecting the destructive conversion of sulfurous compounds into hydrogen sulfide and hydrocarbons, is a composite of an alumina-containing refractory inorganic oxide, a rhenium component, a germanium component and a platinum or palladium component. Through the utilization of a particular sequence of processing steps, the use of the foregoing described catalytic composites inhibits the formation of high molecular weight polymers and co-polymers to a degree that permits processing for an extended period of time. Briefly, this is accomplished by initiating the hydrorefining reactions at temperatures below about 500° F., at which temperatures the coke-forming reactions are not promoted. The operating conditions within the second reaction zone are such that the sulfurous compounds are removed without incurring the detrimental polymerization reactions otherwise resulting were it not for the saturation of the conjugated di-olefinic hydrocarbons within the first reaction zone.

The hydrocarbon charge stock, for example a naphtha by-product (butane-350° F. end point) from a commercially cracking unit designed and operated for the production of ethylene, having a gravity of about 39.1° API, a bromine number of about 66.0, a diene value of about 85.5 and containing about 200 p.p.m. by weight of sulfur and 64.5 vol. percent aromatic hydrocarbons, is admixed with recycled hydrogen. The hydrogen concentration is within the range of about 1,500 to about 10,000 s.c.f./bbl., and preferably in the range of from 1,500 to about 6,000 s.c.f./bbl. The charge stock is heated to a temperature in the range of from about 200° F. to about 500° F., and preferably to a temperature above about 300° F., (340° F.) by way of heat-exchange with various product effluent streams, and is introduced into the first reaction zone at an LHSV in the range of about 0.5 to about 10.0 (1.0). The reaction zone is maintained at a pressure of from 400 to about 1,000 p.s.i.g., and preferably at a level in the range of from 500 p.s.i.g. to about 900 p.s.i.g.

The temperature of the product effluent from the first reaction zone (440° F.) is increased to a level above about 500° F. and preferably in the range of about 500° F. to about 800° F. (625° F.). When the process is functioning efficiently, the diene value of the liquid charge entering the second catalytic reaction zone is less than about 1.0, and often less than about 0.5. The conversion of sulfurous compounds and nitrogenous compounds (where present in the charge stock), as well as the saturation of mono-olefins, contained within the first zone effluent, is effected in the second zone. The second catalytic reaction zone is maintained under an imposed pressure of from 400 to about 1,000 p.s.i.g., and preferably at a level of from about 500 to about 900 p.s.i.g. The two stage process is facilitated when the focal point for pressure control is the high-pressure separator (750 p.s.i.g.) serving to separate the product effluent from the second catalytic reaction zone. It will therefore, be maintained at a pressure slightly less than the first catalytic reaction zone as a result of fluid flow through the system. The LHSV through the second reaction zone is about 0.5 to about 10.0 (3.0), based upon fresh feed only. The hydrogen concentration will be in a range of from 1,000 to about 10,000 s.c.f./bbl., and preferably from about 1,000 to about 8,000 s.c.f./bbl. Series-flow through the entire system is facilitated when the recycle hydrogen is admixed with the fresh hydrocarbon charge stock. Make-up hydrogen, to supplant that consumed in the overall process (881 s.c.f./bbl. overall) may be introduced from any suitable external source, but is preferably introduced into the system by way of the effluent line from the first catalytic reaction zone to the second catalytic reaction zone.

With respect to the normally liquid portion of the product effluent, including butanes, the aromatic concentration is about 64.0% by volume, the bromine number is about 0.3 and the diene value is essentially nil.

With charge stocks having exceedingly high diene values, a recycle diluent is employed in order to prevent an excessive temperature rise in the reaction system. Where so utilized, the source of the diluent is preferably a portion of the normally liquid product effluent from the second catalytic reaction zone. The precise quantity of recycle material varies from feed stock to feed stock; however, the rate at any given time is simply controlled by monitoring the diene value of the combined liquid feed to the first reaction zone. As the diene value exceeds a level of about 25.0, the quantity of recycle is increased, thereby increasing the combined liquid feed ratio; when the diene value approaches a level of about 20.0, or less, the quantity of recycle diluent may be lessened, thereby decreasing the combined liquid feed ratio.

A thermally cracked gasoline from an ethylene unit, having a gravity of 42.7° API and a boiling range from $C_5$ to 375° F. end point, is prefractionated to provide a $C_6$ to $C_8$ aromatic-rich heart cut. The charge stock has a boiling range of 165° F. to 295° F. and a gravity of 34.4° API. The contaminants include 200 p.p.m. by weight of sulfur, a bromine number of 40.0 and a diene value of about 25. This commercially-scaled unit is designed to process 5,000 bbl./day of the $C_6$ to $C_8$ fraction. Since the desired end result is the production of an aromatic-rich, desulfurized and olefin-free product, the process is effected in two stages; the first stage contains a catalytic composite of alumina, 0.20% by weight of germanium, 0.375% by weight of platinum, 0.375% by weight of rhenium and 0.5% by weight of lithium.

The 5,000 bbl./day of aromatic concentrate, 77.0% $C_6$–$C_8$ aromatics by volume, is supplied by way of a depentanizer and rerun column. The rerun column overhead is at a temperature of 180° F.; this is admixed with 1,250 bbl./day of a recycled diluent (combined liquid feed ratio of 1.25) and 1,000 s.c.f./bbl. of a hydrogen-rich recycle gas phase based on combined feed. The mixture, at a temperature of 195° F., is subjected to heat-exchange with various hot effluent streams to raise its temperature to 250° F. The material enters the first reaction zone at a pressure of 860 p.s.i.g., and contacts the catalytic composite at a LHSV of 3.0, based on combined liquid feed. The product effluent emanates from the first reaction zone at a pressure of about 850 p.s.i.g. and a temperature of about 310° F. The temperature of the first reaction zone product effluent is increased to a level of about 600° F., and is introduced into the second reaction zone under a pressure of about 790 p.s.i.g. The LHVS, inclusive of the recycle diluent is 3.75 and the hydrogen circulation rate is about 1,500 s.c.f./bbl., inclusive of make-up hydrogen and based on combined liquid feed. The second reaction zone contains a catalyst of a composite of alumina, 0.375% by weight of rhenium, 0.375% by weight of genmanium and 0.375% palladium. The reaction product effluent is introduced, following its use as the heat-exchange medium and further cooling to reduce its temperature from 650° F. to a level of about 350° F. (720 p.s.i.g. at this stage), into a hot separator. A liquid phase in an amount of 3,269 bbl./day is removed as a bottoms stream, of which 1,250 bbl./day is recycled to combine with the fresh feed to the first reaction zone. A vaporous phase is cooled to a temperature of 100° F., and is introduced into a cold separator at a pressure of about 720 p.s.i.g. The cold separator serves to provide the hydrogen-rich recycle gas phase and a normally liquid stream (3,348 bbl./day) which is combined with 2,019 bbl./day of net hot separator liquid. In order to maintain process pressure control, a portion of the vapor phase from the cold separator is vented.

The 5,367 bbl./day of normally liquid product is introduced into a reboiled stripping column which serves to remove hydrogen sulfide and light hydrocarbons, and to concentrate the $C_6$ to $C_8$ aromatics as a bottoms stream. Conditions generally imposed on the stripping column are a top pressure of 155 p.s.i.g., a top temperature of 316° F., a bottom pressure of 160 p.s.i.g. and a bottom temperature of 419° F. The bottoms product stream is recovered in an amount of 5,087 bbl./day (686.02 moles/hr.), and analyses indicate an aromatic concentration of about 76.6% by volume: the sulfur concentration is about 0.5 p.p.m., and both the diene value and bromine number are essentially "nil." The following Table I indicates the yield and distribution, based upon 690.86 moles/hr. of fresh feed, exclusive of the 686.02 moles/hr. of aromatic product. In the table, the yields are inclusive of the cold separator and stripper vent gas streams. The component analysis of the make-up hydrogen gas stream is presented for the sake of completeness.

TABLE I

Hydrogenation distribution, moles/hr.

| Component | Make-up gas | Vent gases |
|---|---|---|
| Hydrogen sulfide | 1.42 | 1.82 |
| Hydrogen | 534.30 | 285.30 |
| Methane | 134.64 | 135.04 |
| Ethane | 32.06 | 32.36 |
| Propane | 7.12 | 7.22 |
| iso-Butane | 0.87 | 0.97 |
| n-Butane | 1.28 | 1.38 |
| iso-Pentane | 0.43 | 0.53 |
| n-Pentane | 0.28 | 0.38 |
| $C_6$-plus |  | 4.84 |

It should be noted that the indicated minor degree of cracking, evidenced by only a slight increase in $C_1$–$C_5$ yield, illustrates the high degree of selectivity possessed by the germanium-rhenium-noble metal catalyst for hydrogenating coke-forming distillates.

EXAMPLE II

This example illustrates still another hydrocarbon hydro processing scheme, specifically directed toward the improvement of the jet fuel characteristics of sulfurous, kerosene boiling range fractions. The improvement is especially noticeable in the IPT Smoke Point, the concentration of aromatic hydrocarbons and the concentration of sulfur. This is normally considered a two-stage process wherein desulfurization is effected in the first reaction zone at relatively mild severities which result in a normally liquid product effluent containing from about 15 to about 35 p.p.m. of sulfur by weight. Aromatic saturation is the principal reaction effected in the second reaction zone, having disposed therein a catalytic composite of alumina, a halogen component, a rhenium component, a germanium component and a Group VIII noble metal component.

Suitable charge stocks are kerosene fractions which may have an initial boiling point as low as about 300° F., and an end boiling point as high as about 600° F. Exemplary of such kerosene fractions are those boiling from about 300° F. to about 550° F., from 330° F. to about 500° F., from 330° F. to about 530° F., from 350° F. to 550° F., etc. As a specific example, a kerosene obtained from hydrocracking a Mid-continent slurry oil, having a gravity of about 30.5° API, an initial boiling point of about 388° F., an end boiling point of about 522° F., indicates an IPT Smoke Point of 17.1 mm., and contains 530 p.p.m. by weight of sulfur and 24.8% by volume of aromatic hydrocarbons. Through the use of the catalytic process of the present invention, the improvement in the jet fuel quality of such a kerosene fraction is most significant with respect to raising the IPT Smoke Point, and reducing the concentration of sulfur and the quantity of aromatic hydrocarbons. Published specifications for the poorest quality of jet fuel, commonly referred to as Jet-A, Jet-Al and Jet-B, call for a sulfur concentration of about 0.3% by weight maximum (3,000 p.p.m.), a minimum IPT Smoke Point of 25 mm. and a maximum aromatic concentration of about 20.0 volume percent.

In practicing the present invention, the charge stock is admixed with recycled hydrogen in an amount within the range of from about 1,000 to about 2,000 s.c.f./bbl. This mixture is heated to a temperature level necessary to control the maximum catalyst bed temperature below about 725° F., and preferably not above 700° F., with a lower catalyst bed temperature of about 600° F. The catalyst, a standard hydrogenation composite, containing about 2.2% by weight of cobalt and about 5.7% by weight of molybdenum, composited with alumina, is disposed in a reaction zone maintained under an imposed pressure in the range of from about 500 to about 1,100 p.s.i.g. The LHSV is in the range of about 0.5 to about 10.0, and preferably from about 0.5 to about 5.0. The total reaction product effluent from this first catalytic reaction zone is separated to provide a hydrogen-rich gaseous phase and a normally liquid hydrocarbon stream containing from 15 p.p.m. to about 35 p.p.m. of sulfur by weight. The normally liquid phase portion of the first reaction zone effluent is utilized as a fresh feed charge stock to the second reaction zone. In this particular instance, the first reaction zone decreases the sulfur concentration to about 25 p.p.m., the aromatic concentration to about 16.3% by volume and has increased the IPT Smoke Point to a level of about 21.5 mm.

The catalytic composite within the second reaction zone comprises alumina, 0.25% by weight of rhenium, 0.50% by weight of germanium, about 0.70% by weight of combined chloride and 0.25% by weight of platinum, calculated on the basis of the elements. The reaction zone is maintained at a pressure of about 400 to about 1,500 p.s.i.g., and the hydrogen circulation rate is in the range of 1,500 to about 10,000 s.c.f./bbl. The LHSV is in the range of about 0.5 to about 5.0, and preferably from about 0.5 to about 3.0. It is preferred to limit the catalyst bed temperature in the second reaction zone to a maximum level of about 750° F. With a catalyst of these particular chemical and physical characteristics, optimum aromatic saturation, processing a feed stock containing from about 15 to about 35 p.p.m. of sulfur, is effected at maximum catalyst bed temperatures in the range of about 625° F. to about 750° F. With respect to the normally liquid kerosene fraction, recovered from the condensed liquid removed from the total product effluent, the sulfur concentration is effectively "nil," being less than 0.1 p.p.m. The quantity of aromatic hydrocarbons has been decreased to a level of about 1.0% by volume, or less, and the IPT Smoke Point has been increased to about 35.0 mm.

With respect to another kerosene fraction, having an IPT Smoke Point of about 20.7 mm., an aromatic concentration of about 19.5 vol. percent and a sulfur concentration of about 17 p.p.m. by weight, the same is processed in a catalytic reaction zone at a pressure of about 800 p.s.i.g. and a maximum catalyst bed temperature of about 700° F. The LHSV is about 1.25, and the hydrogen circulation rate is about 8,000 s.c.f./bbl. The catalytic composite disposed within the reaction zone comprises alumina, 0.01% by weight of rhenium, 0.2% by weight of germanium, about 0.80% by weight of combined chloride and 0.5% by weight of platinum. Following separation and distillation to concentrate the kerosene fraction, analyses indicate that the Smoke Point has been increased to a level of about 37.0 mm., the aromatic concentration has been lowered to about 0.50% by volume and the sulfur concentration is essentially "nil," being less than 0.1 p.p.m. by weight.

The foregoing specification, especially the examples thereof, illustrates the process of the present invention and the benefits afforded through the utilization thereof.

I claim as my invention:

1. A process for hydrotreating a hydrocarbonaceous charge stock containing sulfurous compounds and aromatic hydrocarbons which comprises reacting said charge stock and hydrogen in a reaction zone under hydrogen consuming non-cracking conditions at a temperature of from about 200° F. to about 900° F. and a pressure of from about 400 to about 5,000 p.s.i.g. and in contact with a catalytic composite containing from 0.01% to about 2.0% by weight of a Group VIII noble metal component, from 0.01% to about 5.0% by weight of a germanium component and from 0.01% to about 2.0% by weight of a rhenium component, on an elemental basis, combined with a porous carrier material.

2. The process of claim 1 further characterized in that said charge stock is a coke-forming hydrocarbon distillate containing conjugated di-olefinic and mono-olefinic hydrocarbons, hydrogen is reacted therewith at conditions including a maximum catalyst bed temperature in the range of from 200° F. to about 500° F., said catalytic composite contains an alkali metal component and the reaction product effluent is separated to recover an aromatic/mono-olefinic hydrocarbon concentrate substantially free from conjugated di-olefinic hydrocarbons.

3. The process of claim 1 further characterized in that said charge stock contains mono-olefinic hydrocarbons, hydrogen is reacted therewith at conditions including a maximum catalyst bed temperature in the range of from 500° F. to about 900° F. and the reaction product effluent is separated to recover an aromatic-rich stream substantially free from sulfurous compounds and mono-olefinic hydrocarbons.

4. The process of claim 1 further characterized in that said charge stock is a kerosene boiling range fraction, hydrogen is reacted therewith at a maximum catalyst bed temperature below about 750° F., said catalytic composite contains a halogen component and the reaction product effluent is separated to recover a kerosene fraction having improved jet fuel characteristics and reduced aromatic hydrocarbon content.

5. The process of claim 1 further characterized in that said catalytic composite contains from about 0.1% to about 1.5% by weight of a halogen component, on an elemental basis.

6. The process of claim 1 further characterized in that said catalytic composite contains from about 0.01% to about 1.5% by weight of an alkali metal component on an elemental basis.

References Cited
UNITED STATES PATENTS

| | | | |
|---|---|---|---|
| 3,415,737 | 12/1968 | Kluksdahl | 208—139 |
| 2,906,700 | 9/1959 | Stine et al. | 208—138 |
| 3,522,169 | 7/1970 | Ireland | 208—141 |
| 3,617,510 | 11/1971 | Hayes | 208—112 |

HERBERT LEVINE, Primary Examiner

U.S. Cl. X.R.

208—217; 252—466 PT